(12) United States Patent
Epstein

(10) Patent No.: US 6,743,154 B2
(45) Date of Patent: Jun. 1, 2004

(54) OMNIDIRECTIONAL MOVING SURFACE

(76) Inventor: Neil B. Epstein, 1091 Aaron Rd., North Brunswick, NJ (US) 08902

( * ) Notice: Subject to any disclaimer, the term of this patent is extended or adjusted under 35 U.S.C. 154(b) by 391 days.

(21) Appl. No.: 09/974,896

(22) Filed: Oct. 12, 2001

(65) Prior Publication Data
US 2004/0048722 A1 Mar. 11, 2004

Related U.S. Application Data

(60) Provisional application No. 60/294,679, filed on Jun. 1, 2001.

(51) Int. Cl.$^7$ ............................................... A63B 22/06
(52) U.S. Cl. .......................................... 482/54; 482/51
(58) Field of Search ...................... 482/51, 54; 119/700

(56) References Cited

U.S. PATENT DOCUMENTS

| 5,179,440 A | 1/1993 | Loban et al. |
| 5,562,572 A | 10/1996 | Carmein |
| 5,577,981 A | 11/1996 | Jarvik |
| 5,655,909 A | 8/1997 | Kitchen et al. |
| 5,667,459 A | 9/1997 | Su |
| 5,694,533 A | 12/1997 | Richards et al. |
| 5,713,794 A | 2/1998 | Shimojima et al. |
| 5,846,134 A | 12/1998 | Latypov |
| 5,860,811 A | 1/1999 | Henderson |
| 5,872,438 A | 2/1999 | Roston |
| 5,902,214 A | 5/1999 | Makikawa et al. |
| 5,926,153 A | 7/1999 | Ohishi et al. |
| 6,050,822 A | * 4/2000 | Faughn ........................ 482/54 |
| 6,123,647 A | * 9/2000 | Mitchell ....................... 482/54 |
| 6,152,854 A | * 11/2000 | Carmein ....................... 482/54 |

* cited by examiner

Primary Examiner—Glenn E. Richman
(74) Attorney, Agent, or Firm—Blank Rome LLP

(57) ABSTRACT

The disclosed method includes the steps positioning a first plurality of ball bearings around a spindle; enveloping the first plurality of ball bearings and the spindle with a bladder; and injecting a viscous substance into the bladder. The disclosed system includes a plurality of ball bearings; a bladder for enveloping the plurality of ball bearings; and an interface for connecting the bladder to a virtual reality means.

16 Claims, 8 Drawing Sheets

NOTE: BLADDER IS SHOWN STRETCHED AROUND SPINDLE ASSEMBLY

OMNIDIRECTIONAL MOVING SURFACE

This application claims benefit of Provisional Application Serial No. 60/294,679 filed Jun. 1, 2001.

BACKGROUND OF THE INVENTION

1. Field of the Invention

The present invention relates to an input apparatus operating in a virtual reality environment. More specifically, the present invention is directed to a bladder driven omnidirectional moving surface used as an input device in a virtual reality system that simulates an exercising environment.

2. Description of the Prior Art

A major limitation in state-of-the-art virtual reality systems is the inability to permit simple walking and running. In such systems, navigation is typically experienced as a disembodied center of consciousness which is directed by pointing, or by manipulation of a joystick, trackball, mouse, or similar device. The actual physical sensation of walking is limited to one of two forms: a) The user is restricted to a confined and immobile surface where tracking and signal generation are well-controlled, and b) the user is confined to a device such as a linear treadmill or wheelchair which transduces the user's linear motion to virtual space navigation.

The conventional linear treadmill has a movable track which can be upwardly inclined. The track is only movable in one direction, which restricts motion of the user to the direction of movement of the track. A monitor, such as a motivational electric display, associated with the track typically records the time, speed, and distance accomplished by the user.

Use of a linear treadmill, consisting of one continuous moving track, in conjunction with a monitor permits a user to walk in a straight line. Users cannot step in arbitrary directions as they would be able to in real life. This limitation in directionality detracts from the immersive nature of the experience, and requires that the experience take on more of a vehicular nature rather than freely walking and navigating body.

U.S. Pat. No. 5,562,572 discloses an omni-directional treadmill that would eliminate the aforementioned directionality limitation. Because that system is based on two sets of conveyors, one enabling movement in a direction perpendicular to the other, that system may not function as expected when users decide to take turns that are diagonal to the rotation of the conveyors. Consequently, there is a need in the art for a fully omni-directional moving surface that can be used as a treadmill.

SUMMARY OF THE INVENTION

The systems and methods of the present invention combine the use of a novel moving surface assembly with virtual reality systems.

More specifically, the method includes the steps of positioning a first plurality of ball bearings around a spindle; enveloping the first plurality of ball bearings and the spindle with a bladder; and injecting a viscous substance into the bladder. The method further includes the steps of positioning a second plurality of ball bearings in a base; placing the bladder in the base such that the bladder is in contact with the second plurality of ball bearings; positioning a trackball in between the base and the bladder; and connecting the trackball to a processor used for providing a virtual reality environment.

The system of the present invention includes a plurality of ball bearings; a bladder for enveloping the plurality of ball bearings; and an interface for connecting the bladder to a virtual reality processor. The system further includes a spindle for positioning the ball bearings such that the ball bearings form a ring around the spindle, the spindle having a top portion to support the weight of a user; a base including a plurality of ball bearings for holding the bladder; a viscous substance enveloped by the bladder and in contact with the ball bearings; and a track ball contacting the bladder and serving as an interface between the bladder and the virtual reality processor.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

The present invention includes a bladder driven omnidirectional moving surface that may be used as a treadmill designed to enable full 360-degree freedom of locomotion. Users may walk, jog or run on the omnidirectional treadmill in any direction, at any velocity, and they may also safely and naturally change direction while in motion.

By enabling full 360-degree freedom of locomotion, the omnidirectional treadmill offers a new alternative to conventional mono-directional treadmill use. The mechanics of the omnidirectional treadmill allow the use of mouse-trackball technology to track the user's locomotion gestures in any direction, and at any rate. With this, the omnidirectional treadmill may be used alone, or in conjunction with a computer generated 360-degree interactive virtual reality environment. This virtual environment responds, in real-time, to the participant's foot movement on the omnidirectional treadmill. The electronic virtual reality environment may be delivered to the participant via virtual reality glasses or on a surrounding projection screen with audio support.

There are basically five components which are strategically assembled in order to create a functional omnidirectional moving surface: a spindle or walking platform; a series of ball-bearings; a bladder; an omnidirectional base or platform; and a trackball sensor.

Spindle-walking Platform

Figure 2:
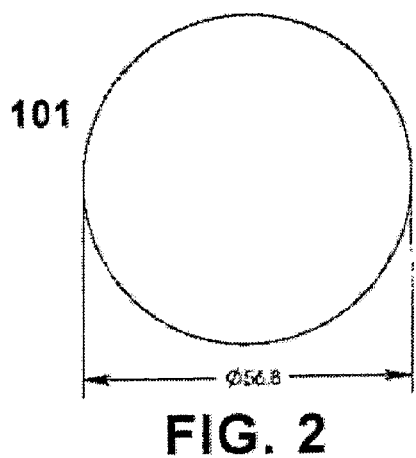
FIG. 2 is a diagram showing a top view of the spindle.
Figure 1:
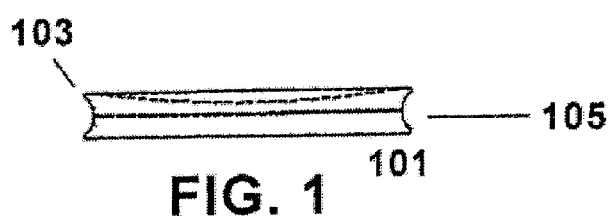
FIG. 1 is a diagram showing a side view of the spindle used as an omnidirectional walking surface in the treadmill of the present invention.

FIG. 1 illustrates a side view of the spindle 101. The spindle 101 may be approximately eight to ten inches high, five-feet in diameter and may weigh from thirty to forty pounds. The spindle 101 may be made of a very robust, yet very lightweight polymer-plastic or nylon material, and should be symmetrical in all dimensions, i.e., top-side-front (see, for example, FIG. 2 for a top view).

The top (locomotion) surface 103 of the spindle 101 is convex. This particular design-dynamic promotes a focused center-of-gravity. The convex nature of the walking/running surface brings the user back to the center of the pad via gravity. The top surface 103 may have a low coefficient of friction.

Ball Bearings

Figure 3:
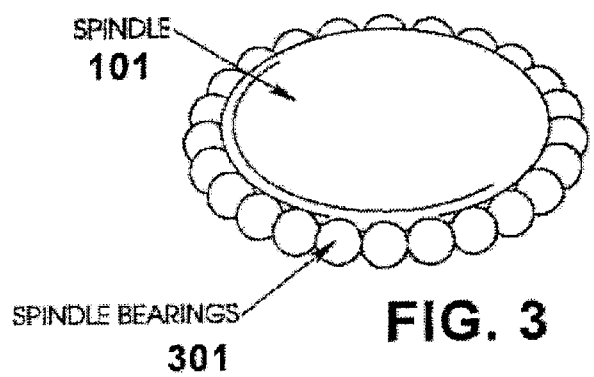
FIG. 3 is a diagram showing ball bearings forming a ring around the spindle.

FIG. 3 illustrates a number of ball-bearings 301 forming a ring around the spindle 101. There may be approximately 10 to 15 lightweight, hollow, hard-plastic ball bearings forming a complete ring around the spindle 101 partially within the spindle groove 105. Each ball bearing may be approximately eight inches in diameter and may weight three to four ounces.

The exact (finite) diameter of the ball bearings may be defined by the size of the outer groove 105 of the spindle 101. The ball bearings 301 enable the free 360-degree mobility of the bladder 401 (see FIG. 4).

Bladder

Figure 4A:
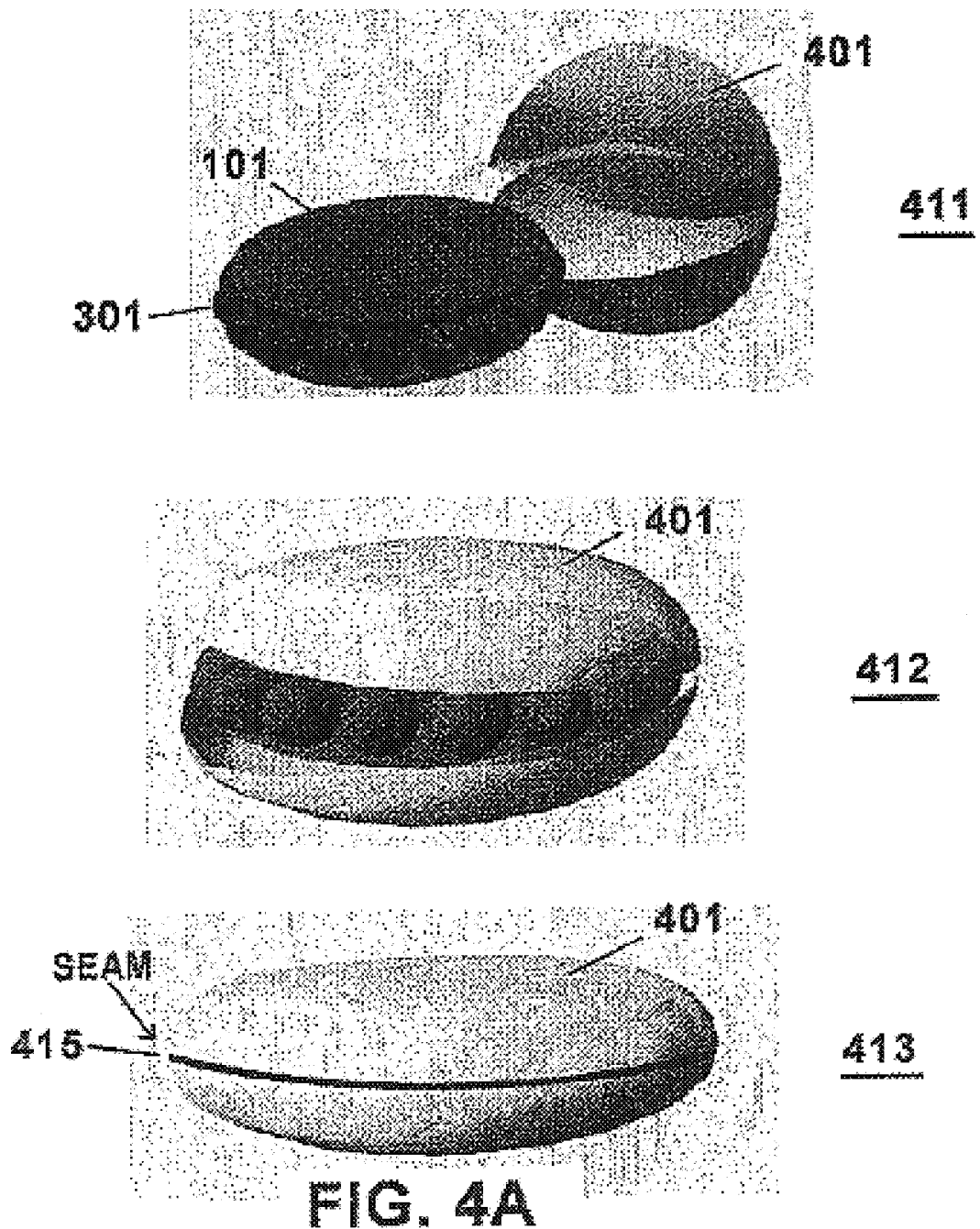
FIGS. 4A–B are diagrams showing processes of enveloping the bladder around the spindle.
Figure 4B:
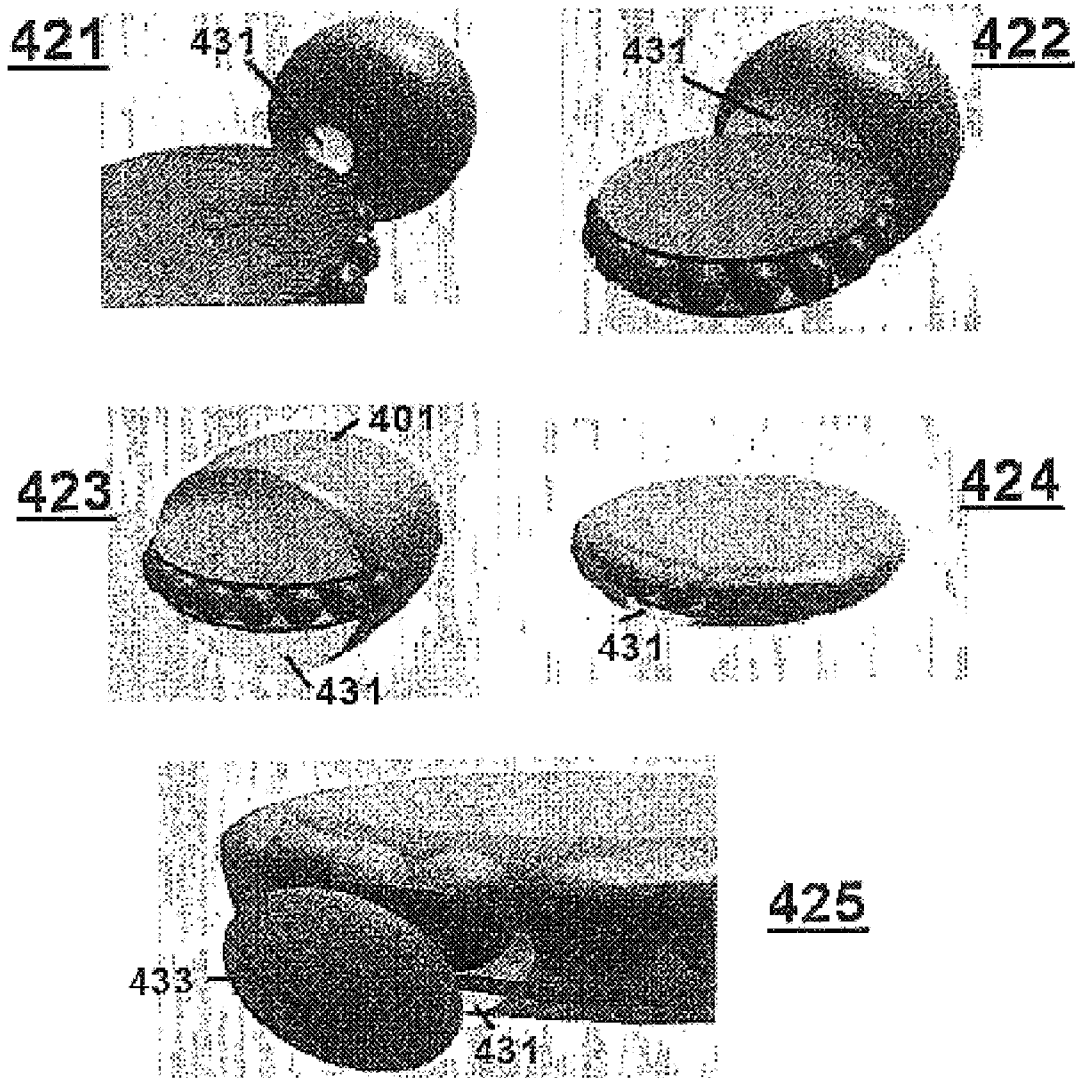

FIG. 4A illustrates a first embodiment for enveloping the spindle 101 and the spindle-bearings 301 with the bladder 401. The bladder 401 may be manufactured as a five-foot spherical rubber-polymer.

In a first embodiment, the bladder 401 is an exceptionally strong and exceptionally pliable spherical hollow rubber-polymer balloon which completely and seamlessly envelops the entire spindle-ball bearing unit. The bladder 401 is first slit open, for example, into two equal hemispheres as illustrated in step 411. The spindle 101 and the ball bearings 301 are then introduced into the bladder 401, as shown in step 412. Finally, the bladder 401 envelops the spindle 101 and ball bearings 301. Heat may then be used to seal the bladder 401, forming a seamless rubber polymer bladder that revolves in 360 degrees around its inner support (i.e., the combination of spindle 101 and ball bearings 301). Step 413 illustrates the heat sealing process.

After the bladder 401 has been heat sealed, a viscous substance, such as a silicon fluid, is hypodermically injected through the bladder skin onto the spindle 101 and ball bearings 301. This provides lubrication of the ball bearings 301, which facilitates the rotation of the ball bearings and of the movement of the bladder 401. Alternatively, the viscous substance may be periodically added or removed from the sealed bladder 401 through a valve component. The valve component may be similar to the valve component of a basketball.

In a second embodiment, the bladder 401 may be manufactured as a highly elastic spheroid with a 4 to 6 inch hole 431 in it, as shown in step 421. The elastic nature of the bladder 401 allows the hole 431 to expand as shown in step 422. The spindle 101 and the ball bearings 301 are then inserted through the hole 431 into the bladder 401 as shown in step 423. The hole 431 would thereafter acquire a smaller shape as illustrated in step 424.

The bladder hole 431 may then be covered with a patch of the same bladder material. The patch may be affixed with a heat sealing process, such as the process used in the first embodiment.

The second embodiment of bladder envelopment may also include incorporating a passage way (e.g., similar to a basketball inflation system) where the viscous substance may be added or subtracted to or from the bladder 401. The viscous substance may also be injected into the bladder 401 as described above. Adjusting the amount of viscous substance inside the bladder 401 allows a user to tighten or loosen the bladder 401 around its inner frame. Users may then customize the feel of the omni-directional moving surface to their own liking.

The bladder may be fabricated of a highly flexible and yet, extremely durable (approximately ¼" thick) rubber-like polymer which can be walked or run upon at any speed by a person of any size and weight. The bladder material is flexible enough to enable a 360-degree change in walking or running direction without crimping, dragging, or hampering the user's locomotion in any way. Polymers with such properties have been developed and they are currently being improved upon by many plastics manufacturers around the world.

An example of such polymers is "moneprene" which is a thermoplastic elastometer; meaning that it has the ability to be sealed with heat.

Gum rubber is another example of the material having the desired properties. It may be first formed as a sheet shaped into a continuous spherical shell, resembling a round, un-inflated balloon. The sheet may be spherical in order to provide isotropic properties with respect to movement of the bladder in any direction over the inner frame.

Figure 7:
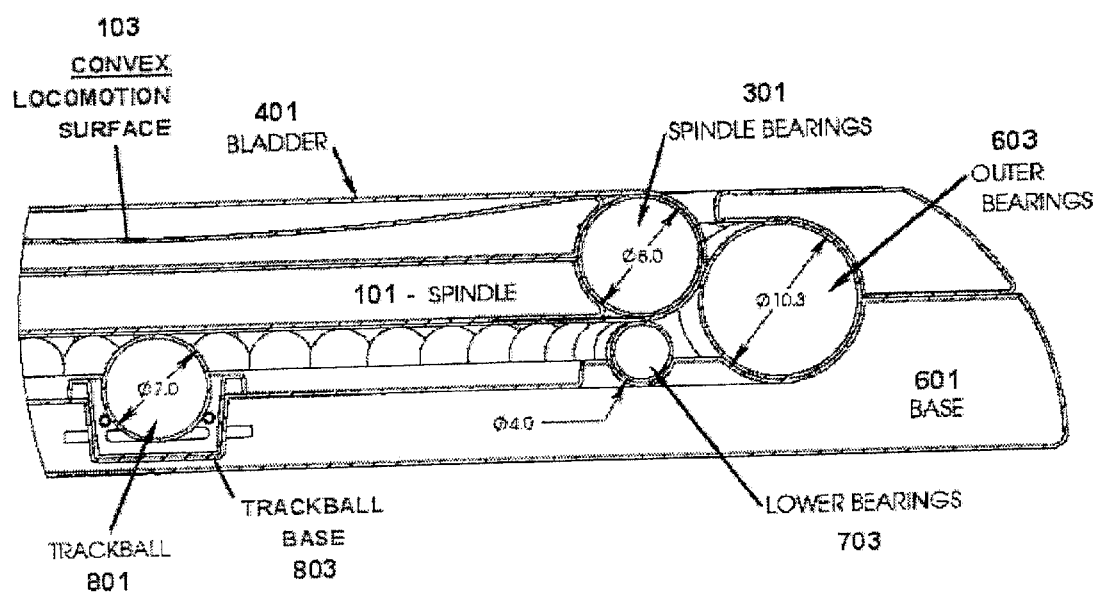
FIG. 7 is a diagram showing a side view of the bladder and the spindle inserted in the omni-directional base.

In either embodiment, the bladder 401 is fitted around the spindle-ball bearing unit tightly enough so that it does not crimp or fold, but loose enough so that it moves or revolves freely around the spindle-ball bearing unit so as to readily enable omnidirectional locomotion. The bladder 401 is the actual moving surface that makes contact with the user's feet and is the element that enables 360-degree mobility and can change direction at any rate or revolution with little or no resistance. Further, it physically relays the users foot-input information to an underlying trackball 801 (see FIG. 7).

The trackball 801 relays the exact position, direction and velocity coordinates of the user to a processor (not shown) that then directs a displayed 3D environment to move in direct, real-time correspondence with the users walking and/or running gestures. This provides an illusion for the user of "moving through-and-about" a virtual reality environment.

In summary, the bladder 401 easily moves or rolls around the spindle-ball bearing unit in a 360 degree treadmill fashion. The spherical and elastic nature of the bladder enables its revolution in every direction (gyration) around the spindle/ball bearing unit.

Viscous Fluid Injection

Figure 5A:
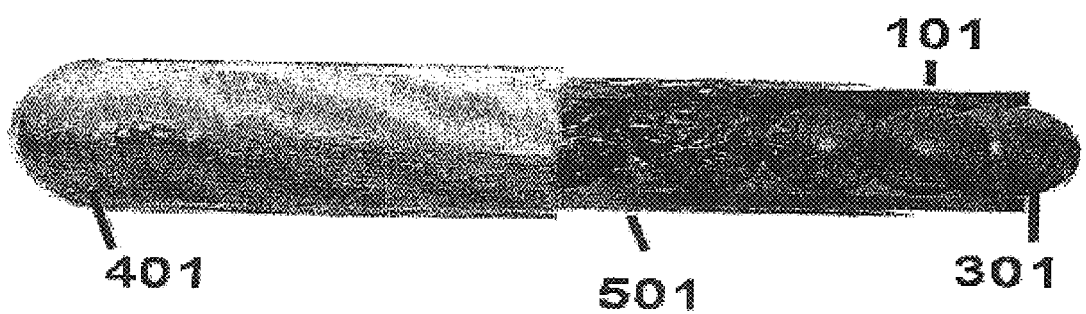
FIGS. 5A–D are diagrams showing the bladder enveloping the ball bearing encircled spindle.

As discussed above, once the bladder 401 is properly manufactured around the spindle-ball bearing unit, a highly viscous substance 501 (see FIG. 5A) may be injected through the skin of the bladder 401 onto the ring of ball bearings 301 which encircle the spindle 101. The viscous substance 501 may be, for example, thick oil or liquid silicon. This process further ensures the ease of mobility and overall responsiveness of the bladder's movement around its frame. Further, it enhances the "natural feel" of walking or running on the 360-degree treadmill of the present invention.

The single unit formed by the conglomeration of the spindle 101, ball bearings 301, and the bladder 401 as described above is hereinafter referred to as the bobbin 605. When assembled, the bobbin 605 may resemble a five-foot diameter, eight-inch high blood cell or pancake.

Figure 5B:
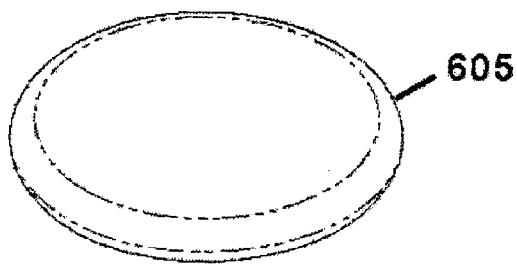
Figure 5C:
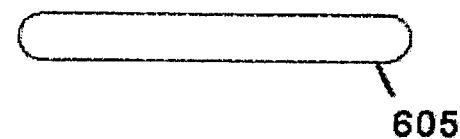
Figure 5D:
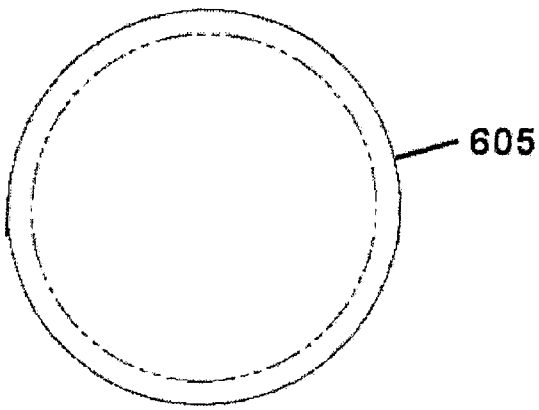

FIG. 5B shows a view of the bladder 401 stretched around the spindle assembly (i.e., the bobbin 605). FIG. 5C illustrates a side view of the bobbin 605. FIG. 5D illustrates a top view of the bobbin 605. In the bobbin, the spindle-ball bearing components are completely enveloped by the bladder 401 and immersed in viscous fluid 501.

OmniDirectional Base

Figure 6A:
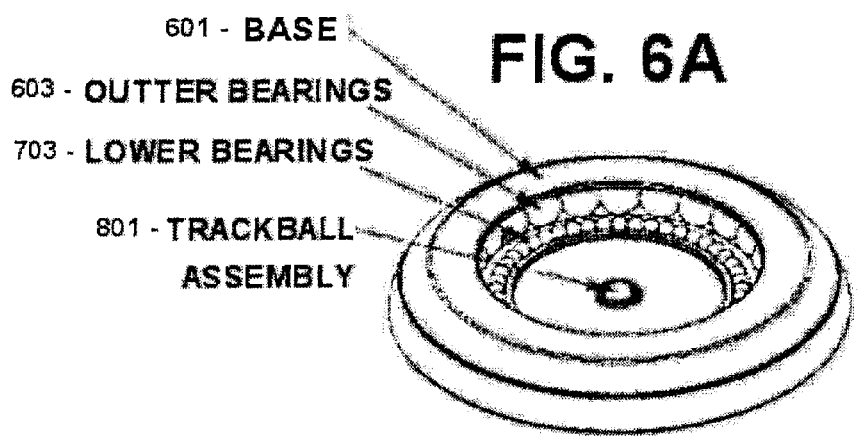
FIGS. 6A–C are diagrams showing an omni-directional base.

FIG. 6A shows the omnidirectional base 601. The bobbin 605, having no stationary surfaces, may be "nested" into a floor standing base (the base 601) which allows the bladder 401 full freedom of 360-degree mobility while keeping the entire bobbin 605 securely and safely in place.

The omnidirectional base 601 may be a circular, one foot high, six foot diameter lightweight platform which cups the bobbin 605. Platform 601 preferably has a double ring of ball bearings around its inner circumference, comprised of an outer ring of hollow plastic ball bearings 603 and a second lower ring of ball bearings 703 may be placed around the inner circumference of the base 601. The double ring formed by the ball bearings 703 and 603 are supporting surfaces which lie in direct contact with the revolving bladder 401. See FIG. 7.

The ball bearings 703 and 603 may be hollow and manufactured of a lightweight (hard-plastic) polymer. Further, they may be made of the same material as the ball bearings 301 that are inside the bobbin 605.

Figure 6B:
Figure 6C:
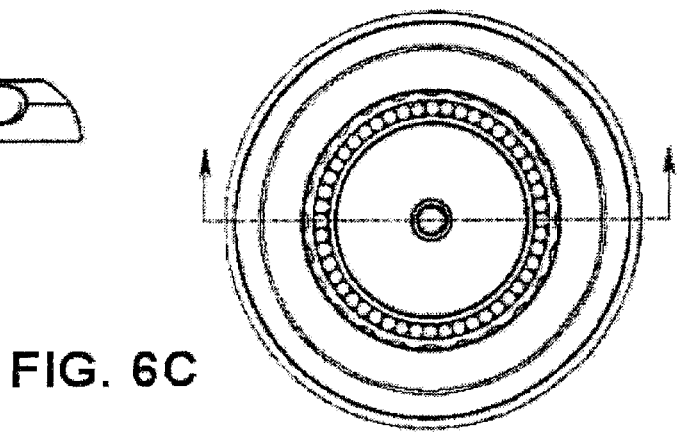

The ball bearings 703 enable full freedom of 360-degree movement for the bladder 401 while simultaneously acting as the main support of the entire bobbin 605. The omnidirectional base 601 may sit directly on the floor. FIGS. 6B and 6C illustrate a side view and a top view of the base 601 respectively.

Trackball

Mounted in the center-bottom of the omnidirectional base 601 is a trackball sensor 801. This component may be similar to that used in a standard computer mouse. For example, the trackball 801 may have a four-inch diameter, and may be made of the same material as the standard computer mouse trackball. The trackball 801 may be mounted in its own base 803 which sits on the floor in the center of the omnidirectional base 601 (see FIG. 7). Sitting in its own base-mount, the trackball 801 may merely touch the rotating center underside of the bladder 401. The motion of the bladder 401 motivates (or rolls) the trackball 801.

The trackball 801 may lie in direct contact with the bladder 401 but does not hinder its mobility whatsoever. The trackball 801 merely records the motion information of the revolving bladder 401 and then transmits that information to the processor (not shown). The processor translates physical motion-information generated by trackball 801 into meaningful data indicative of the user's position, direction and velocity within the electronic virtual environment.

Figure 8:
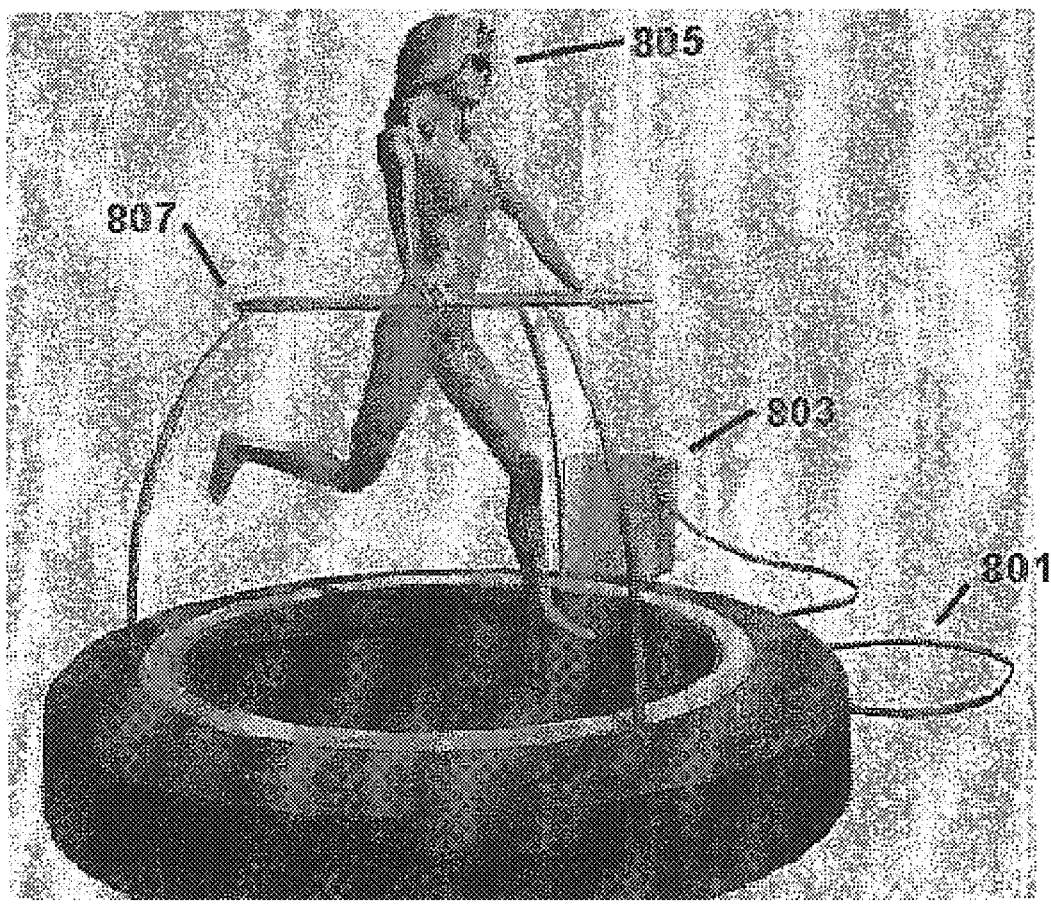
FIG. 8 is a diagram illustrating the use of the omni-directional treadmill.

Turning to FIG. 8, the disclosed omni-directional moving surface enables users to walk, run or jog in any direction, at any rate, and gives them the ability to change direction while engaged in locomotion. The user is expected to plug a cable 801 connecting the trackball to the computer's USB or serial port 803; step on to the moving surface, put on virtual reality glasses 805, and proceed to maneuver through-and-about 360 degree virtual reality exercise environments.

The interaction that occurs between the user and the moving surface is relatively simple and exactly similar to a user's interaction with a conventional mono-directional treadmill (except that locomotion is capable in all directions). The process is: put on sneakers and virtual reality glasses, get on omni-directional treadmill, and walk, run and/or jog in any direction as you would in every day life. The moving surface should become "invisible" to the user, requiring the user to use no more effort in omni-directional locomotion as in conventional (real-world) omni-directional locomotion.

An encircling guard rail 807 surrounding the user at arms distance may be used, such that users do not fall off the treadmill or lose their balance.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. An omnidirectional moving surface system comprising:
   a first plurality of ball bearings;
   a spindle for positioning the ball bearings such that the ball bearings form a ring around the spindle; and
   a bladder for enveloping the plurality of ball bearings.

2. The system of claim 1, further comprising:
   an interface for connecting the bladder to a virtual reality means.

3. The system of claim 1, wherein the spindle has a top portion to support the weight of a user.

4. The system of claim 3, wherein the top portion of the spindle is convex.

5. The system of claim 1, further comprising:
   a base including a second plurality of ball bearings for holding the bladder.

6. The system of claim 1, further comprising:
   a viscous substance enveloped by the bladder and in contact with the first plurality of ball bearings.

7. The system of claim 1, further comprising:
   a track ball contacting the bladder and serving as the interface between the bladder and the virtual reality means.

8. The system of claim 1, wherein the bladder is an elastic spheroid.

9. The system of claim 1, wherein the bladder is comprised of a moneprene material.

10. The system of claim 1, wherein the bladder is comprised of gum rubber.

11. The system of claim 6, wherein the viscous substance is fluid silicon.

12. A method for assembling an exercising apparatus comprising:

positioning a first plurality of ball bearings around a spindle;

enveloping the first plurality of ball bearings and the spindle with a bladder; and injecting a viscous substance into the bladder.

13. The method of claim 12, further comprising:

positioning a second plurality of ball bearings in a base;

placing the bladder in the base such that the bladder is in contact with the second plurality of ball bearings; and positioning a trackball in between the base and the bladder.

14. The method of claim 13, further comprising:

connecting the trackball to virtual reality means.

15. The method of claim 12, wherein the enveloping step comprises:

slitting open the bladder into two hemispheres;

introducing the first plurality of ball bearings and the spindle into the bladder;

enveloping the spindle and the plurality of ball bearings with the bladder; and sealing the bladder with heat.

16. The method of claim 12, wherein the enveloping step comprises:

introducing the first plurality of ball bearings and the spindle through a hole into the bladder; covering the hole with a patch; and affixing the patch to the bladder with a heat sealing process.

\* \* \* \* \*